United States Patent
Teraoka

(10) Patent No.: US 9,618,730 B2
(45) Date of Patent: Apr. 11, 2017

(54) CAMERA LENS

(71) Applicant: Hiroyuki Teraoka, Shenzhen (CN)

(72) Inventor: Hiroyuki Teraoka, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 15/081,283

(22) Filed: Mar. 25, 2016

(65) Prior Publication Data

US 2017/0023772 A1 Jan. 26, 2017

(30) Foreign Application Priority Data

Jul. 21, 2015 (JP) .................. 2015-144424

(51) Int. Cl.
| | |
|---|---|
| *G02B 3/02* | (2006.01) |
| *G02B 13/18* | (2006.01) |
| *G02B 13/00* | (2006.01) |
| *G02B 9/62* | (2006.01) |
| *G02B 27/00* | (2006.01) |

(52) U.S. Cl.
CPC .......... *G02B 13/0045* (2013.01); *G02B 9/62* (2013.01); *G02B 27/0025* (2013.01)

(58) Field of Classification Search
CPC ...... G02B 3/02; G02B 18/18; G02B 13/0045; G02B 13/18; G02B 9/62; G01B 27/0025
USPC .................................... 359/642–830
See application file for complete search history.

(56) References Cited

U.S. PATENT DOCUMENTS

| | | | | |
|---|---|---|---|---|
| 2013/0003193 | A1* | 1/2013 | Huang | G02B 13/0045 359/713 |
| 2016/0033743 | A1* | 2/2016 | Chen | G02B 13/0045 359/708 |
| 2016/0048003 | A1* | 2/2016 | Teraoka | G02B 13/0045 359/757 |
| 2016/0349485 | A1* | 12/2016 | Teraoka | G02B 13/0045 |

* cited by examiner

*Primary Examiner* — Bumsuk Won
*Assistant Examiner* — Tamara Y Washington
(74) *Attorney, Agent, or Firm* — Na Xu; IPro, PLLC

(57) ABSTRACT

A camera lens is disclosed and includes from the object side to the image side: a first lens with positive refractive power; a second lens with negative refractive power; a third lens with negative refractive power; a fourth lens with positive refractive power; a fifth lens with positive refractive power; and a sixth lens with negative refractive power. Specific conditions are satisfied.

5 Claims, 8 Drawing Sheets

CAMERA LENS

FIELD OF THE INVENTION

The present invention relates to a camera lens, particularly relates to a camera lens in which high-pixel CCD, CMOS camera elements are used, such as the mobile phone camera module, WEB camera etc.

DESCRIPTION OF RELATED ART

In recent years, a variety of cameras equipped with CCD, CMOS and other camera elements are extensively popular. Along with the development of miniature and high performance camera elements, the ultrathin and high-luminous flux F (Fno) wide-angle camera lenses with excellent optical properties are needed in society.

The technology related to the camera lens composed of six ultra-thin, high-luminous flux f value (Fno) wide angle lenses with excellent optical properties is developed gradually. The camera lens mentioned in the proposal is composed of 6 lenses, lined up from the object side in an order as follows: The first lens with positive refractive power; the second lens with negative refractive power; the third lens with negative refractive power; the fourth lens with positive refractive power; the fifth lens with positive refractive power and the sixth lens with negative refractive power.

The camera lens disclosed in a related reference is composed of 6 lenses, but the refractive index power of the first lens and the third lens is inadequate; the shape of the second lens is improper; the proportion of the axial distance between the image side of the forth lens and the object side of the sixth lens to the overall focus distance of the camera lens is not proper, therefore, $2\omega=75.8°$, Fno=2.4, wide-angle and Fno luminous flux are not sufficient.

The camera lens disclosed in another related reference is composed of 6 lenses, but the refractive index power of the first lens and the third lens is inadequate; the shape of the second lens is improper, therefore, $2\omega\leq77.0°$, TTL/IH≥1.464, wide angle and ultrathin degree is not sufficient.

The present invention provides an improved camera lens to solve the problems.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF REFERENCE NUMBERS OR LABELS

Figure 1:
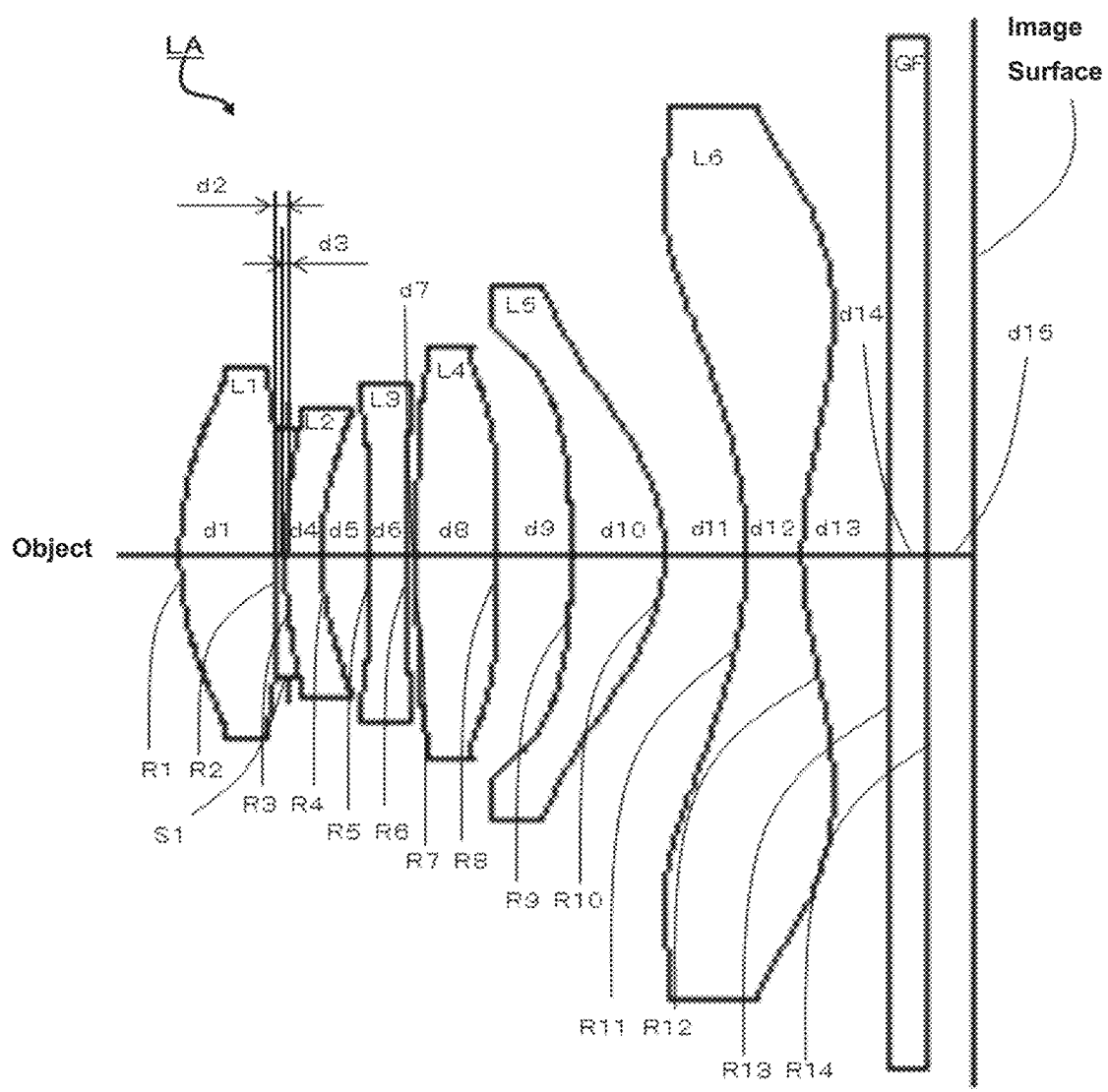
FIG. 1 is a structural diagram of a camera lens LA in one embodiment of the present invention.

The reference numbers or labels in all embodiments are represented as follows, in which, the unit of the distance, radius and center thickness is mm.

LA: Camera lens
S1: Open aperture
L1: The first lens
L2: The second lens
L3: The third lens
L4: The fourth lens
L5: The fifth lens
L6: The sixth lens
GF: Glass plate
f: Overall focal distance of the camera lens LA
f1: The focal distance of the first lens L1
f2: The focal distance of the second lens L2
f3: The focal distance of the third lens L3
f4: The focal distance of the fourth lens L4
f5: The focal distance of the fifth lens L5
f6: The focal distance of the sixth lens L6
Fno: F value
$2\omega$: Total angle of view
R: Curvature radius of image side is the center curvature radius of the lens.
R1: The object side curvature radius of the first lens L1
R2: The image side curvature radius of the first lens L1
R3: The object side curvature radius of the second lens L2
R4: The image side curvature radius of the second lens L2
R5: The object side curvature radius of the third lens L3
R6: The image side curvature radius of the third lens L3
R7: The object side curvature radius of the fourth lens L4
R8: The image side curvature radius of the fourth lens L4
R9: The object side curvature radius of the fifth lens L5
R10: The image side curvature radius of the fifth lens L5
R11: The object side curvature radius of the sixth lens L6
R12: The image side curvature radius of the sixth lens L6
R13: The object side curvature radius of the glass plate GF
R14: The image side curvature radius of glass plate GF
d: The center thickness of lenses and the distance between lenses
d1: The center thickness of the first lens L1
d2: The distance from the image side to the aperture S1 of the first lens L1
d3: The axial distance from the open aperture S1 to the object side of second lens L2
d4: The center thickness of the second lens L2 d5: The axial distance between the image side of the second lens L2 and the object side of the third lens L3
d6: The center thickness of the third lens L3
d7: The axial distance between the image side of the third lens L3 and the object side of the fourth lens L4
d8: The center thickness of the fourth lens L4
d9: The axial distance between the image side of the fourth lens L4 and the object side of the fifth lens L5
d10: The center thickness of the fifth lens L5
d11: The axial distance between the image side of fifths lens L5 and the object side of sixth lens L6
d12: The center thickness of the sixth lens L6
d13: The axial distance between the image side of the sixth lens L6 and the object side of the glass plate GF
d14: The center thickness of the glass plate GF
d15: The axial distance from the image side to the imaging plane of the glass plate GF
nd: Refractive power of line d
nd1: Refractive power of line d of the first lens L1
nd2: Refractive power of line d of the second lens L2
nd3: Refractive power of line d of the third lens L3
nd4: Refractive power of line d of the fourth lens L4
nd5: Refractive power of line d of the fifth lens L5
nd6: Refractive power of line d of the sixth lens L6
nd7: Refractive power of line d of glass plate GF
v: Abbe number
v1: Abbe number of the first lens L1
v2: Abbe number of the second lens L2
v3: Abbe number of the third lens L3
v4: Abbe number of the fourth lens L4
v5: Abbe number of the fifth lens L5
v6: Abbe number of the sixth lens L6
v7: Abbe number of the glass plate GF
TTL: Optical length (the axial distance from the object side to the imaging plane of the first lens L1)
LB: The axial distance from the image side to the imaging plane of the sixth
lens L6 (including the thickness of the glass plate GF)
IH: Image height

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the Fig.s and the embodiments. It should be understood the specific embodiments described hereby is only to explain this disclosure, not intended to limit this disclosure.

The reference Fig.s explains one embodiment of the camera lens in the present invention. FIG. 1 shows the structural diagram of one embodiment of the camera lens of the present invention. The camera lens LA includes six lenses, which are lined up from the object side to the image side in an order as follows: a first lens L1, a second lens L2, a third lens L3, a fourth lens L4, a fifth lens L5 and a sixth lens L6. A glass plate GF is provided between the sixth lens L6 and the imaging plane. The glass plate GF is a cover glass or a light filter having IR cut-off filtration and other functions; or the glass plate GF is not be provided between the sixth lens L6 and the imaging plane.

The first lens L1 has positive refractive power; the second lens L2 has negative refractive power; the third lens L3 has negative refractive power; the fourth lens L4 has positive refractive power; the fifth lens L5 has positive refractive power and the sixth lens L6 has negative refractive power. In order to correct aberration better, the surface of six lenses is best designed to be non-spherical shape.

The camera lens LA satisfies the following condition expressions (1) to (4):

$$0.85 \leq f1/f \leq 1.10 \tag{1}$$

$$-10.00 \leq f3/f \leq -4.50 \tag{2}$$

$$2.50 \leq (R3+R4)/(R3-R4) \leq 4.00 \tag{3}$$

$$0.08 \leq d11/f \leq 0.15 \tag{4}$$

In which:
f: The overall focal distance of the camera lens LA;
f1: The focal distance of the first lens;
f3: The focal distance of the third lens;
R3: The object side curvature radius of the second lens;
R4: The image side curvature radius of the second lens;
d11: The axial distance between the image side of the fifth lens and the object side of the sixth lens.

The condition expression (1) specifies the positive refractive power of the first lens L1. When exceeding the lower limit value of the condition expression (1), although in favor of the ultra-thin development of the lens, the first lens L1 has too big positive refractive power, it is difficult to correct the aberration and other issues. On the contrary, when exceeding the upper limit, the first lens has too small positive refractive power, not conducive to the ultrathin development of lens.

The condition expression (2) specifies the negative refractive power of the third lens L3. If exceeding the limit of the condition expression (2), along with Fno≤2.2 ultra-thin and wide-angle development of the lens, it is difficult to correct magnification chromatic aberration.

The condition expression (3) specifies the shape of the second lens L2. If exceeding the limit of the condition expression (3), along with Fno≤2.2 ultra-thin and wide-angle development of the lens, it is difficult to correct the axial chromatic aberration.

The condition expression (4) specifies the proportion of the distance between the image side of the forth lens and the object side of the sixth lens to the overall focus distance of the camera lens LA. When exceeding the lower limit of the condition expression (4), although in favor of the ultra-thin development of the lens, it is difficult to correct the abaxial chromatic aberration in corresponding view angle. When exceeding the upper limit value, it is not conducive to the ultra-thin development of the lens.

The second lens L2 has positive refractive power and satisfies the following condition expression (5):

$$-2.50 \leq f2/f \leq -1.00 \tag{5}$$

In which:
f: The overall focal distance of the camera lens LA;
f2: The focal distance of the second lens;

The condition expression (5) specifies the negative refractive power of the second lens L2. If exceeding the limit of the condition expression (5), along with Fno≤2.2 ultra-thin and wide-angle development of the lens, it is difficult to correct the axial chromatic aberration.

The fourth lens L4 has positive refractive power and satisfies the following condition expression (6).

$$2.50 \leq f4/f \leq 6.00 \tag{6}$$

In which, f is the overall focal distance of the camera lens LA; f4 is the focal distance of the fourth lens.

The condition expression (6) specifies the positive refractive power of the fourth lens L4. If exceeding the limit of the condition expression (6), it is not conducive to Fno≤2.2 ultra-thin and wide-angle development of lens.

The first lens L1 has positive refractive power and satisfies the following condition expression (7).

$$-1.50 \leq (R1+R2)/(R1-R2) \leq -0.50 \quad (7)$$

In which, R1 is the object side curvature radius of the first lens; R2 is the image side curvature radius of the first lens.

The condition expression (7) specifies the shape of the first lens L1. If exceeding the limit of the condition expression (7), along with Fno≤2.2 ultra-thin and wide-angle development of the lens, it is difficult to correct the spherical aberration and other higher aberration issues.

The third lens L3 has negative refractive power and satisfies the following condition expression (8).

$$1.00 \leq (R5+R6)/(R5-R6) \leq 5.00 \quad (8)$$

In which:
R5: The object side curvature radius of the third lens;
R6: The image side curvature radius of the third lens;

The condition expression (8) specifies the shape of the third lens L3. If exceeding the limit of the condition expression (8), along with Fno≤2.2 ultra-thin and wide-angle development of the lens, it is difficult to correct magnification chromatic aberration issues.

As six lenses of the camera lens LA have the structure described previously and meet all condition expressions, the camera lens composed of six TTL (optical length)/IH (image height)≤1.45, ultrathin, wide-angle 2ω≥82°, high-luminous flux Fno≤2.2 lenses with excellent optical properties can be produced.

EMBODIMENTS

The camera lens LA of the present invention is described with the embodiments as follows. The symbols in all embodiments are represented as follows. In addition, the unit of the distance, radius and center thickness is mm.
f: Overall focal distance of the camera lens LA
f1: The focal distance of the first lens L1
f2: The focal distance of the second lens L2
f3: The focal distance of the third lens L3
f4: The focal distance of the fourth lens L4
f5: The focal distance of the fifth lens L5
f6: The focal distance of the sixth lens L6
Fno: F value
2ω: Total angle of view
S1: Open aperture
R: Curvature radius of image side is the center curvature radius of the lens.
R1: The object side curvature radius of the first lens L1
R2: The image side curvature radius of the first lens L1
R3: The object side curvature radius of the second lens L2
R4: The image side curvature radius of the second lens L2
R5: The object side curvature radius of the third lens L3
R6: The image side curvature radius of the third lens L3
R7: The object side curvature radius of the fourth lens L4
R8: The image side curvature radius of the fourth lens L4
R9: The object side curvature radius of the fifth lens L5
R10: The image side curvature radius of the fifth lens L5
R11: The object side curvature radius of the sixth lens L6
R12: The image side curvature radius of the sixth lens L6
R13: The object side curvature radius of the glass plate GF
R14: The image side curvature radius of glass plate GF
d: The center thickness of lenses and the distance between lenses
d1: The center thickness of the first lens L1
d2: The distance from the image side to the aperture S1 of the first lens L1
d3: The axial distance from the open aperture S1 to the object side of second lens L2
d4: The center thickness of the second lens L2
d5: The axial distance between the image side of the second lens L2 and the object side of the third lens L3
d6: The center thickness of the third lens L3
d7: The axial distance between the image side of the third lens L3 and the object side of the fourth lens L4
d8: The center thickness of the fourth lens L4
d9: The axial distance between the image side of the fourth lens L4 and the object side of the fifth lens L5
d10: The center thickness of the fifth lens L5
d11: The axial distance between the image side of fifths lens L5 and the object side of sixth lens L6
d12: The center thickness of the sixth lens L6
d13: The axial distance between the image side of the sixth lens L6 and the object side of the glass plate GF
d14: The center thickness of the glass plate GF
d15: The axial distance from the image side to the imaging plane of the glass plate GF
nd: Refractive power of line d
nd1: Refractive power of line d of the first lens L1
nd2: Refractive power of line d of the second lens L2
nd3: Refractive power of line d of the third lens L3
nd4: Refractive power of line d of the fourth lens L4
nd5: Refractive power of line d of the fifth lens L5
nd6: Refractive power of line d of the sixth lens L6
nd7: Refractive power of line d of glass plate GF
v: Abbe number
v1: Abbe number of the first lens L1
v2: Abbe number of the second lens L2
v3: Abbe number of the third lens L3
v4: Abbe number of the fourth lens L4
v5: Abbe number of the fifth lens L5
v6: Abbe number of the sixth lens L6
v7: Abbe number of the glass plate GF
TTL: Optical length (the axial distance from the object side to the imaging plane of the first lens L1)
LB: The axial distance from the image side to the imaging plane of the sixth lens L6 (including the thickness of the glass plate GF)
IH: Image height $$y=(x2/R)/[1+\{1-(k+1)(x2/R2)\}^{1/2}]+A4\times 4+A6\times 6+A8\times 8+A10\times 10+A12\times 12+A14\times 14+A16\times 16 \quad (9)$$

In which, R is the axial curvature radius; k is the cone constant, A4, A6, A8, A10, A12, A14, A16 are aspherical coefficients.

As a matter of convenience, the aspheric surface of all lenses adopts the aspheric surface in condition expression (9). But not limited to the polynomial forms of the aspheric surface in the condition expression (9).

Embodiment 1

Figure 2:
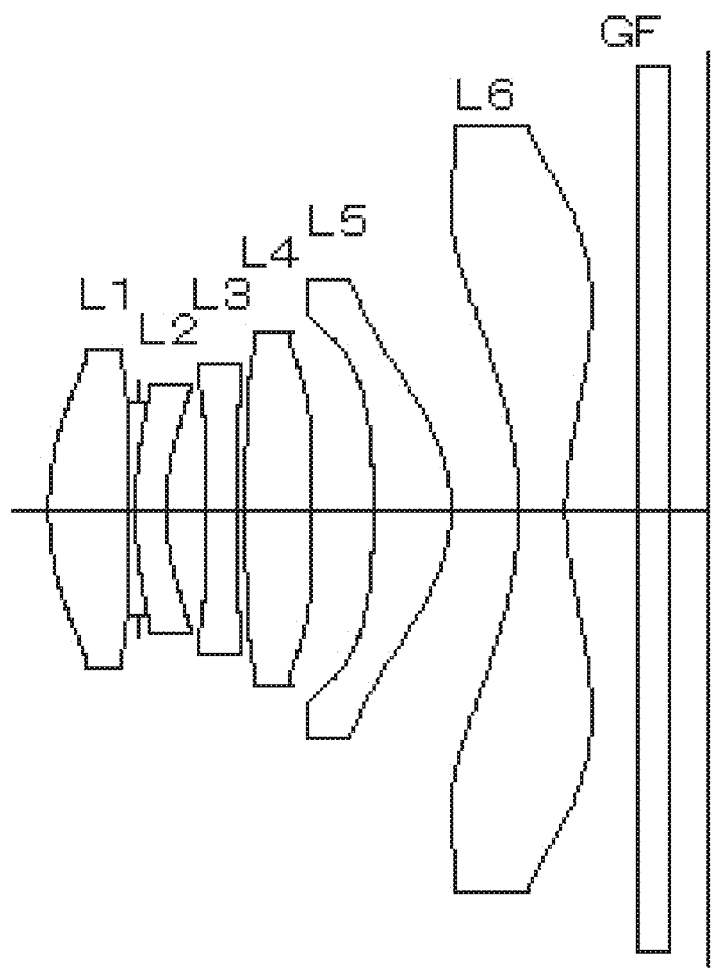
FIG. 2 is a structural diagram of a camera lens of embodiment 1 of the disclosure.

FIG. 2 is the structural diagram of a camera lens LA in embodiment 1. The curvature radius R of the object side and image side of the first lens L1 to sixth lens L6, center thickness of the lenses or the distance d between the lenses, refractive power nd, Abbe number v of the camera lens LA in the embodiment 1 are shown in table 1. The cone constant k and aspherical coefficient are shown in table 2.

TABLE 1

|  | R | d |  | nd |  | vd |
|---|---|---|---|---|---|---|
| R1 | 2.03282 | d1 = 0.558 | nd1 | 1.5441 | v1 | 56.12 |
| R2 | -19.93247 | d2 = 0.072 |  |  |  |  |
| S1 | ∞ | d3 = -0.020 |  |  |  |  |
| R3 | 2.78316 | d4 = 0.216 | nd2 | 1.6422 | v2 | 22.41 |
| R4 | 1.64715 | d5 = 0.270 |  |  |  |  |
| R5 | 42.51913 | d6 = 0.220 | nd3 | 1.6422 | v3 | 22.41 |
| R6 | 9.27262 | d7 = 0.058 |  |  |  |  |
| R7 | 5.68102 | d8 = 0.476 | nd4 | 1.5441 | v4 | 56.12 |
| R8 | 52.62998 | d9 = 0.436 |  |  |  |  |
| R9 | -6.99008 | d10 = 0.546 | nd5 | 1.5441 | v5 | 56.12 |
| R10 | -1.09011 | d11 = 0.477 |  |  |  |  |
| R11 | -2.93771 | d12 = 0.329 | nd6 | 1.5441 | v6 | 56.12 |
| R12 | 1.76981 | d13 = 0.520 |  |  |  |  |
| R13 | ∞ | d14 = 0.210 | nd7 | 1.5168 | v6 | 64.17 |
| R14 | ∞ | d15 = 0.269 |  |  |  |  |

TABLE 2

|  | Cone Constant | Aspherical Coeffecient | | | | | | |
|---|---|---|---|---|---|---|---|---|
|  | k | A4 | A6 | A8 | A10 | A12 | A14 | A16 |
| R1 | -8.5177E-01 | 6.4257E-04 | 4.3220E-03 | -8.2039E-03 | -1.4208E-04 | 3.0955E-03 | 4.5870E-03 | -1.1337E-02 |
| R2 | 0.0000E+00 | 2.6822E-02 | -1.6747E-02 | -3.2933E-03 | -1.3521E-03 | -7.1245E-03 | -5.6572E-02 | 4.3199E-02 |
| R3 | -1.3917E+01 | -5.1856E-03 | 2.6893E-02 | 7.3495E-03 | -2.9717E-02 | -3.6417E-02 | -6.1611E-02 | 1.0379E-01 |
| R4 | -4.5526E+00 | -2.1692E-02 | 9.6074E-02 | 3.5787E-02 | -4.8609E-02 | -8.3232E-02 | -4.4927E-02 | 2.0432E-01 |
| R5 | 4.1544E+02 | 2.1863E-03 | -1.0180E-01 | -4.6675E-02 | 3.0465E-03 | -2.3599E-02 | -7.3970E-02 | 2.6902E-01 |
| R6 | 5.4472E+01 | 1.2607E-03 | -5.9916E-02 | -1.6210E-02 | 1.0731E-02 | 1.2057E-02 | 8.9380E-03 | 6.3636E-03 |
| R7 | 0.0000E+00 | -8.8723E-02 | 3.2210E-02 | 1.4470E-02 | 1.4401E-03 | 7.7278E-04 | -9.4008E-04 | -4.5181E-04 |
| R8 | 0.0000E+00 | -9.2219E-02 | -1.8649E-02 | 9.6955E-04 | 1.1933E-03 | 3.2053E-03 | 2.9773E-03 | 4.2921E-04 |
| R9 | 1.6834E+01 | -6.1539E-02 | 2.5808E-02 | 1.7542E-03 | -9.9991E-03 | -1.7005E-03 | 8.3213E-04 | 8.8685E-04 |
| R10 | -3.0678E+00 | -7.4751E-02 | 3.3659E-02 | 1.4796E-03 | 4.2216E-04 | -4.3315E-04 | -1.5101E-04 | 2.2776E-05 |
| R11 | 0.0000E+00 | 2.7764E-03 | 4.9448E-03 | 7.6319E-05 | -6.4755E-05 | -1.2592E-06 | 4.8810E-07 | 1.3221E-08 |
| R12 | -1.2637E+01 | -3.6666E-02 | 7.1847E-03 | -1.3454E-03 | 9.7793E-05 | 2.2532E-06 | -1.3537E-07 | -1.9250E-08 |

The values in the embodiments 1 to 3 and the corresponding values of the parameters specified in the condition expressions (1) to (8) are listed in following table 7.

As shown in table 7, the embodiment 1 meets the condition expression (1) to (8).

Figure 3:
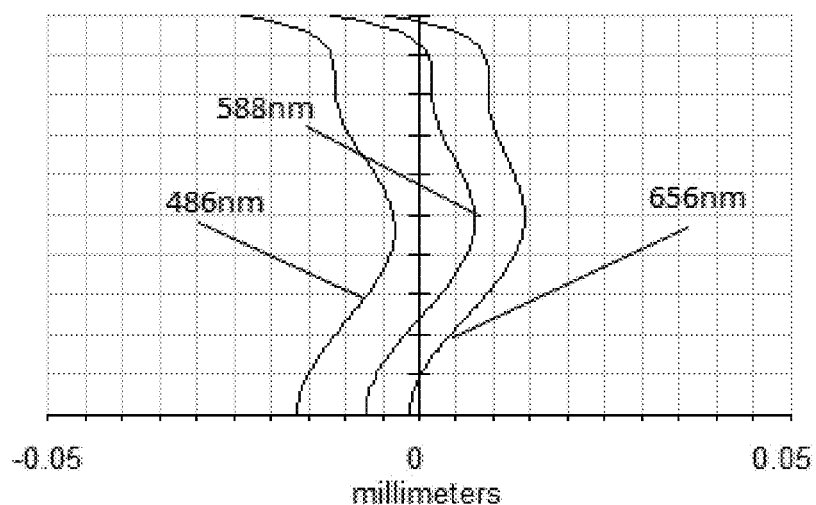
FIG. 3 is a diagram of the spherical aberration (axial chromatic aberration) of the camera lens LA in embodiment 1.
Figure 4:
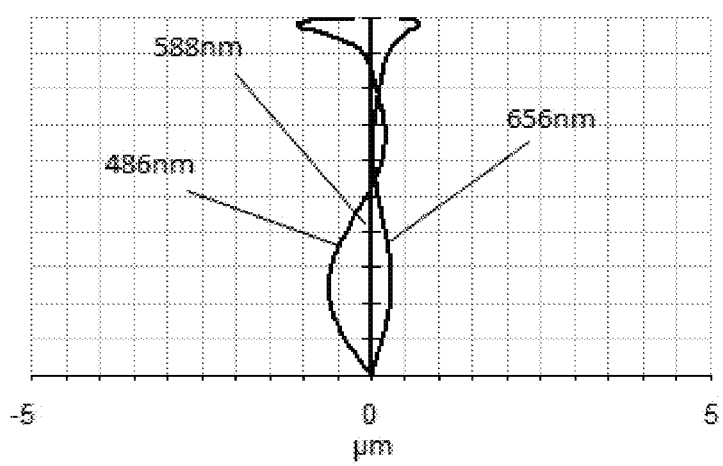
FIG. 4 is a diagram of the magnification chromatic aberration of the camera lens LA in embodiment 1.
Figure 5:
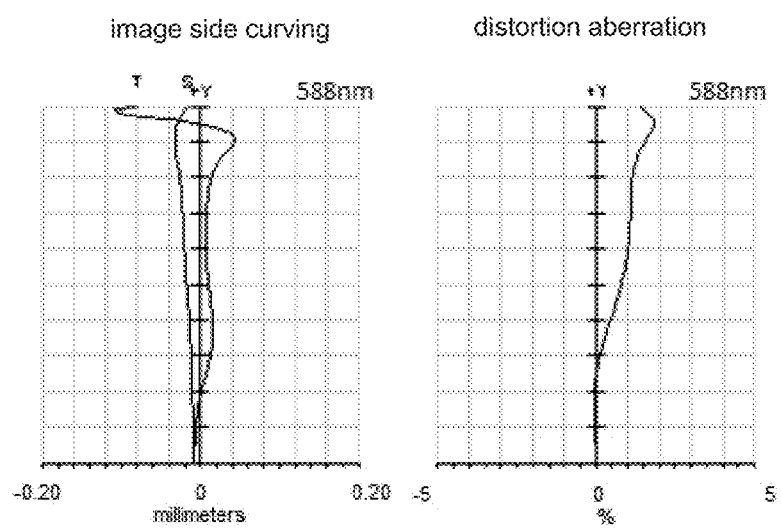
FIG. 5 is a diagram of the image side curving and distortion aberration of the camera lens LA in embodiment 1.

FIG. 3 is the diagram of the spherical aberration (axial chromatic aberration) of the camera lens LA in the embodiment 1; FIG. 4 is the diagram of the magnification chromatic aberration; FIG. 5 is the diagram of the image side curving and distortion aberration; In addition, the image side curving S in FIG. 5 is the image side curving relative to sagittal plane; T is the image side curving relative to the tangent plane. It is same also in embodiment 2 and 3. In embodiment 1, the camera lens LA with 2ω=83.9°, TTL/IH=1.422, Fno=2.05 and ultra-thin, high-luminous flux and wide-angle lenses as shown in FIGS. 3 to 5 is easy to understand that it has excellent optical properties.

Embodiment 2

Figure 6:
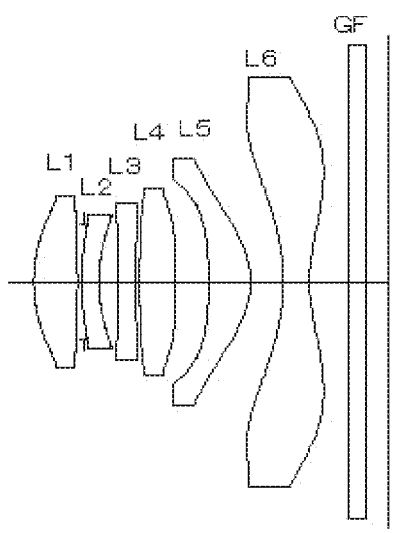
FIG. 6 is a structural diagram of a camera lens of embodiment 2 of the disclosure.

FIG. 6 is the structural diagram of the camera lens LA in the embodiment 2; The curvature radius R of the object side and image side of the first lens L1 to sixth lens L6, center thickness of the lenses and the distance d between the lenses, refractive power nd and Abbe number v of the camera lens LA in the embodiment 2 are shown in table 3. The cone constant k and aspherical coefficients are shown in table 4.

TABLE 3

|  | R | d |  | nd |  | vd |
|---|---|---|---|---|---|---|
| R1 | 1.92937 | d1 = 0.571 | nd1 | 1.5441 | v1 | 56.12 |
| R2 | -16.04613 | d2 = 0.075 |  |  |  |  |
| S1 | ∞ | d3 = -0.020 |  |  |  |  |
| R3 | 3.44052 | d4 = 0.220 | nd2 | 1.6422 | v2 | 22.41 |

TABLE 3-continued

|  | R | d |  | nd |  | vd |
|---|---|---|---|---|---|---|
| R4 | 1.72032 | d5 = 0.259 |  |  |  |  |
| R5 | 28.59900 | d6 = 0.221 | nd3 | 1.6422 | v3 | 22.41 |
| R6 | 10.20990 | d7 = 0.055 |  |  |  |  |
| R7 | 5.84636 | d8 = 0.466 | nd4 | 1.5441 | v4 | 56.12 |
| R8 | 73.95723 | d9 = 0.441 |  |  |  |  |
| R9 | -6.70148 | d10 = 0.551 | nd5 | 1.5441 | v5 | 56.12 |
| R10 | -1.08873 | d11 = 0.429 |  |  |  |  |
| R11 | -2.94315 | d12 = 0.344 | nd6 | 1.5441 | v6 | 56.12 |
| R12 | 1.79503 | d13 = 0.520 |  |  |  |  |
| R13 | ∞ | d14 = 0.210 | nd7 | 1.5168 | v6 | 64.17 |
| R14 | ∞ | d15 = 0.298 |  |  |  |  |

TABLE 4

|  | Cone Constant | Aspherical Coeffecient | | | | | | |
|---|---|---|---|---|---|---|---|---|
|  | k | A4 | A6 | A8 | A10 | A12 | A14 | A16 |
| R1 | -8.3891E-01 | 6.6024E-04 | 4.6405E-03 | -8.9822E-03 | 3.0454E-04 | 4.2769E-03 | 5.2521E-03 | -1.2476E-02 |
| R2 | 0.0000E+00 | 3.6167E-02 | -1.5936E-02 | -4.2482E-03 | -2.1406E-03 | -1.0377E-02 | -5.9997E-02 | 4.8950E-02 |
| R3 | -1.5729E+01 | -5.6059E-03 | 2.9056E-02 | 1.0013E-02 | -2.7439E-02 | -3.5585E-02 | -6.4169E-02 | 9.4581E-02 |
| R4 | -4.3991E+00 | -1.9461E-02 | 1.2210E-02 | 3.7679E-02 | -4.7716E-02 | -8.4170E-02 | -4.8552E-02 | 1.9674E-01 |
| R5 | 1.7584E+02 | 1.7091E-03 | -1.0168E-01 | -4.7142E-02 | 1.5618E-03 | -2.5137E-02 | -7.4424E-02 | 2.7064E-01 |
| R6 | 5.3137E+01 | 1.3172E-03 | -6.0752E-02 | -1.6092E-02 | 1.1769E-02 | 1.3126E-02 | 9.4334E-03 | 5.9051E-03 |
| R7 | 0.0000E+00 | -8.9416E-02 | 3.1820E-02 | 1.3996E-02 | 6.9627E-04 | 1.7806E-04 | -1.0612E-03 | -1.4828E-04 |
| R8 | 0.0000E+00 | -9.0850E-02 | -1.8199E-02 | 9.1377E-04 | 1.0705E-03 | 3.1196E-03 | 2.9401E-03 | 4.2003E-04 |
| R9 | 1.7827E+01 | -6.6702E-02 | 3.2192E-03 | 1.6088E-02 | -1.0061E-02 | -1.7276E-03 | 8.2262E-04 | 8.9045E-04 |
| R10 | -2.9964E+00 | -7.5813E-02 | 3.3378E-02 | 1.4008E-03 | 4.1000E-04 | -4.3674E-04 | -1.5297E-04 | 2.1977E-05 |

TABLE 4-continued

| | Cone Constant | Aspherical Coeffecient | | | | | | |
|---|---|---|---|---|---|---|---|---|
| | k | A4 | A6 | A8 | A10 | A12 | A14 | A16 |
| R11 | 0.0000E+00 | 2.6978E-03 | 4.9309E-03 | 7.4527E-05 | -6.5039E-05 | -1.2582E-06 | 4.9632E-07 | 1.5915E-08 |
| R12 | -1.2325E+01 | -3.6737E-02 | 7.1804E-03 | -1.3454E-03 | 9.7837E-05 | 2.2644E-06 | -1.3323E-07 | -1.8891E-08 |

As shown in table 7, the embodiment 2 meets the condition expressions (1)-(8).

Figure 7:
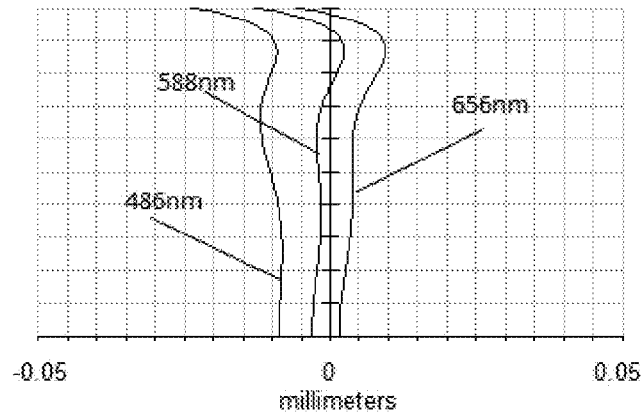
FIG. 7 is a diagram of the spherical aberration (axial chromatic aberration) of the camera lens LA in embodiment 2.
Figure 8:
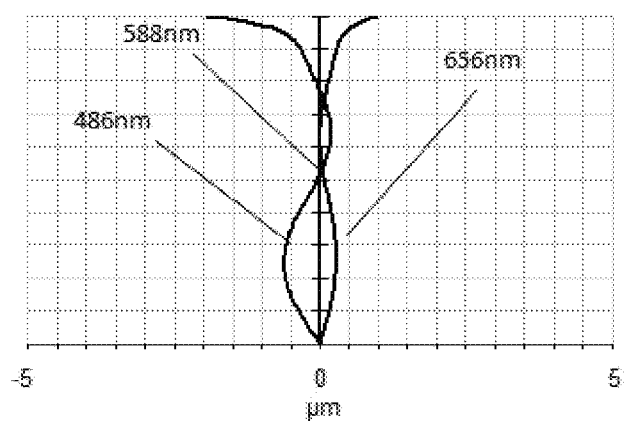
FIG. 8 is a diagram of the magnification chromatic aberration of the camera lens LA in embodiment 2.
Figure 9:
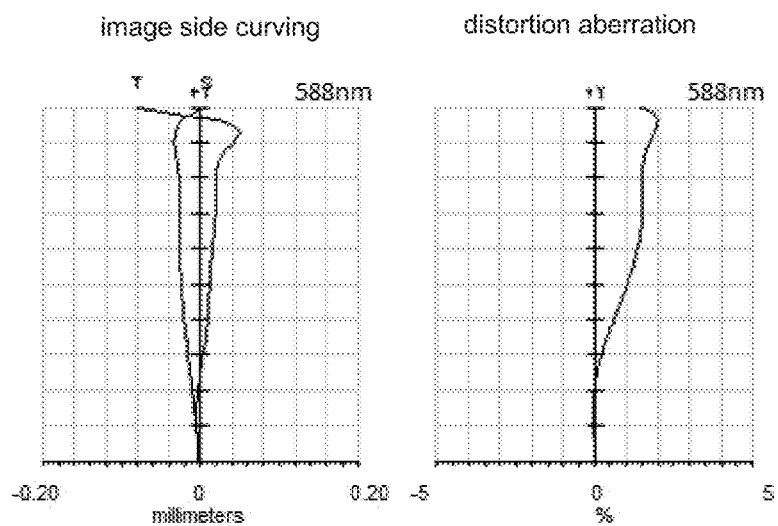
FIG. 9 is a diagram of the image side curving and distortion aberration of the camera lens LA in embodiment 2.

FIG. 7 is the diagram of the spherical aberration (axial chromatic aberration) of the camera lens LA in the embodiment 2; FIG. 8 is the diagram of the magnification chromatic aberration; FIG. 9 is the diagram of the image side curving and distortion aberration; As shown in FIGS. 7-9, in the embodiment 2, the camera lens LA, with full image angle 2ω=83.4°, TTL/IH=1.423, Fno=2.05, ultra-thin, high-luminous flux wide-angle lenses, is easy to understand that it has excellent optical properties.

Embodiment 3

Figure 10:
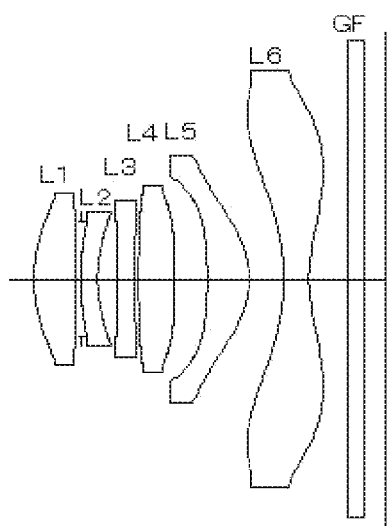
FIG. 10 is a structural diagram of a camera lens of embodiment 3 of the disclosure.

FIG. 10 is the structural diagram of the camera lens LA in the embodiment 3; The curvature radius R of the object side and image side of the first lens L1 to sixth lens L6, center thickness of the lenses and the distance d between the lenses, refractive power nd and Abbe number ν of the camera lens LA in the embodiment 3 are shown in table 5. The cone constant k and aspherical coefficient are shown in table 6.

TABLE 5

| | R | d | | nd | | vd |
|---|---|---|---|---|---|---|
| R1 | 2.02102 | d1 = | 0.555 | nd1 | 1.5441 | v1 | 56.12 |
| R2 | -17.11059 | d2 = | 0.075 | | | | |
| S1 | ∞ | d3 = | -0.020 | | | | |
| R3 | 2.95304 | d4 = | 0.217 | nd2 | 1.6422 | v2 | 22.41 |
| R4 | 1.64342 | d5 = | 0.263 | | | | |
| R5 | 27.56111 | d6 = | 0.222 | nd3 | 1.6422 | v3 | 22.41 |
| R6 | 10.72823 | d7 = | 0.057 | | | | |
| R7 | 5.92768 | d8 = | 0.464 | nd4 | 1.5441 | v4 | 56.12 |
| R8 | 70.78538 | d9 = | 0.439 | | | | |
| R9 | -6.91410 | d10 = | 0.556 | nd5 | 1.5441 | v5 | 56.12 |
| R10 | -1.08764 | d11 = | 0.453 | | | | |
| R11 | -2.94590 | d12 = | 0.329 | nd6 | 1.5441 | v6 | 56.12 |
| R12 | 1.79846 | d13 = | 0.520 | | | | |
| R13 | ∞ | d14 = | 0.210 | nd7 | 1.5168 | v6 | 64.17 |
| R14 | ∞ | d15 = | 0.277 | | | | |

As shown in table 7, the embodiment 3 meets the condition expressions (1) to (8).

Figure 11:
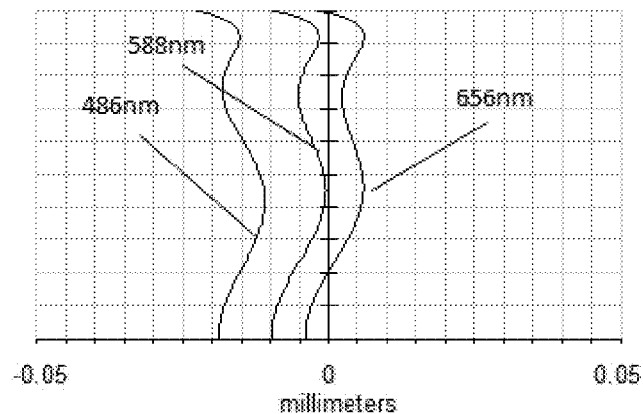
FIG. 11 is a diagram of the spherical aberration (axial chromatic aberration) of the camera lens LA in embodiment 3.
Figure 12:
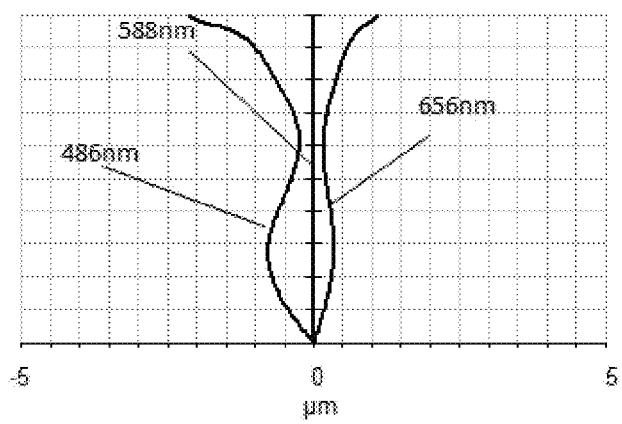
FIG. 12 is a diagram of the magnification chromatic aberration of the camera lens LA in embodiment 3.
Figure 13:
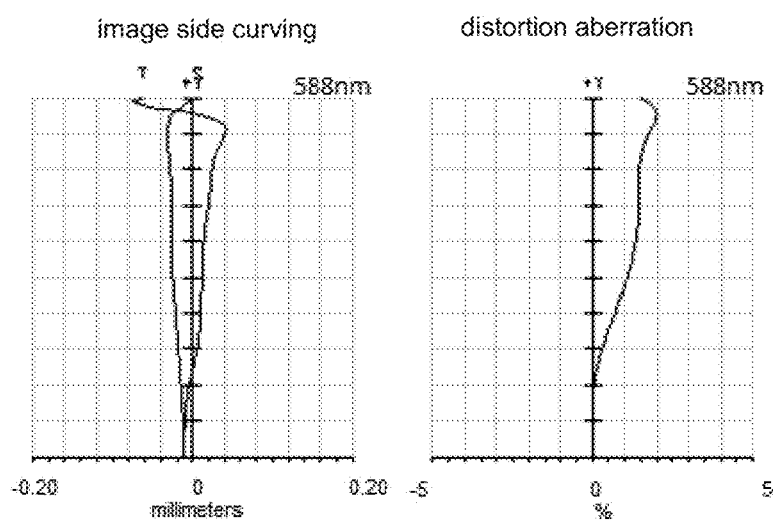
FIG. 13 is a diagram of the image side curving and distortion aberration of the camera lens LA in embodiment 3

FIG. 11 is the diagram of the spherical aberration (axial chromatic aberration) of the camera lens LA in the embodiment 3; FIG. 12 is the diagram of the magnification chromatic aberration; FIG. 13 is the diagram of the image side curving and distortion aberration; In embodiment 3, the camera lens LA2 with ω=84.4°, TTL/IH=1.416, Fno=2.05 ultra-thin, high-luminous flux wide-angle lenses, as shown in FIGS. 11 to 13, is easy to understand that it has excellent optical properties.

The values of the embodiments and the corresponding values of the parameters specified in the condition expressions (1) to (8) are listed in table 7. In addition, the units in table are 2ω (°), F (mm), F1 (mm), F2 (mm), F3 (mm), F4 (mm), F5 (mm), F6 (mm), TTL (mm), LB (mm), IH (mm).

TABLE 7

| | Embodiment 1 | Embodiment 2 | Embodiment 3 | Condition |
|---|---|---|---|---|
| f1/f | 0.96 | 0.89 | 0.95 | 1 |
| f3/f | -5.19 | -6.90 | -7.80 | 2 |
| (R3 + R4)/(R3 - R4) | 3.90 | 3.00 | 3.51 | 3 |
| d11/f | 0.13 | 0.12 | 0.13 | 4 |
| f2/f | -1.90 | -1.57 | -1.75 | 5 |
| f4/f | 3.27 | 3.23 | 3.36 | 6 |
| (R1 + R2)/(R1 - R2) | -0.81 | -0.79 | -0.79 | 7 |
| (R5 + R6)/(R5 - R6) | 1.56 | 2.11 | 2.27 | 8 |
| Fno | 2.05 | 2.05 | 2.05 | |
| 2ω | 83.9 | 83.4 | 84.4 | |
| TTL/IH | 1.422 | 1.423 | 1.416 | |
| f | 3.565 | 3.602 | 3.526 | |
| f1 | 3.421 | 3.201 | 3.356 | |
| f2 | -6.789 | -5.640 | -6.171 | |
| f3 | -18.514 | -24.842 | -27.494 | |
| f4 | 11.663 | 11.639 | 11.860 | |
| f5 | 2.299 | 2.309 | 2.295 | |
| f6 | -1.981 | -1.998 | -2.003 | |
| TTL | 4.637 | 4.640 | 4.617 | |
| LB | 0.999 | 1.028 | 1.007 | |
| IH | 3.260 | 3.260 | 3.260 | |

TABLE 6

| | Cone Constant | Aspherical Coeffecient | | | | | | |
|---|---|---|---|---|---|---|---|---|
| | k | A4 | A6 | A8 | A10 | A12 | A14 | A16 |
| R1 | -8.5915E-01 | 4.8836E-04 | 4.4175E-03 | -9.9818E-03 | -1.4481E-03 | 2.7162E-03 | 5.2823E-03 | -1.0259E-02 |
| R2 | 0.0000E+00 | 2.9285E-02 | -1.7790E-02 | -4.1745E-03 | -1.1523E-04 | -6.2139E-03 | -5.6190E-02 | 4.4117E-02 |
| R3 | -1.5308E+01 | -6.1390E-03 | 2.7297E-02 | 8.2379E-03 | -2.8709E-02 | -3.5294E-02 | -6.0228E-02 | 1.0591E-01 |
| R4 | -4.4960E+00 | -2.1071E-02 | 1.0178E-02 | 3.6121E-02 | -4.8696E-02 | -8.3993E-02 | -4.6594E-02 | 2.0146E-01 |
| R5 | 8.2109E+01 | 1.4955E-03 | -1.0112E-01 | -4.5480E-02 | 3.1822E-03 | -2.4910E-02 | -7.6089E-02 | 2.6643E-01 |
| R6 | 5.5628E+01 | 2.0009E-03 | -5.9979E-02 | -1.6231E-02 | 1.0773E-02 | 1.2118E-02 | 9.1342E-03 | 6.6540E-03 |
| R7 | 0.0000E+00 | -8.9844E-02 | 3.1474E-02 | 1.4097E-02 | 1.2617E-03 | 7.7182E-04 | -9.2729E-04 | -6.3490E-04 |
| R8 | 0.0000E+00 | -9.1044E-02 | -1.8146E-02 | 1.0053E-03 | 1.1029E-03 | 3.1150E-03 | 2.9014E-03 | 3.7344E-04 |
| R9 | 1.7699E+01 | -6.6353E-02 | 3.3667E-03 | 1.5869E-03 | -1.0124E-02 | -1.7881E-03 | 7.8831E-04 | 8.7477E-04 |
| R10 | -2.9920E+00 | -7.5761E-02 | 3.3415E-02 | 1.4223E-03 | 4.2110E-04 | -4.3203E-04 | -1.5213E-04 | 2.1376E-05 |
| R11 | 0.0000E+00 | 2.7135E-03 | 4.9306E-03 | 7.4250E-05 | -6.5026E-05 | -1.2626E-06 | 4.9558E-07 | 1.5446E-08 |
| R12 | -1.2155E+01 | -3.6764E-02 | 7.1779E-03 | -1.3452E-03 | 9.7932E-05 | 2.2779E-06 | -1.3235E-07 | -1.8919E-08 |

What is claimed is:

1. A camera lens, comprising, from the object side to the image side:
   a first lens with positive refractive power;
   a second lens with negative refractive power;
   a third lens with negative refractive power;
   a fourth lens with positive refractive power;
   a fifth lens with positive refractive power;
   a sixth lens with negative refractive power, wherein
   the camera lens satisfies the following specific conditions:

$$0.85 \leq f1/f \leq 1.10;$$

$$-10.00 \leq f3/f \leq -4.50;$$

$$2.50 \leq (R3+R4)/(R3-R4) \leq 4.00;$$

$$0.08 \leq d11/f \leq 0.15;$$

where, f is the overall focal distance of the camera lens; f1 is the focal distance of the first lens; f3 is the focal distance of the third lens; R3 is the object side curvature radius of the second lens; R4 is the image side curvature radius of the second lens; d11 is the axial distance between the image side of the fifth lens and the object side of the sixth lens.

2. The camera lens according to claim 1 further satisfying the following specific condition:

$$-2.50 \leq f2/f \leq -1.00$$

where, f is the overall focal distance of the camera lens; f2 is the focal distance of second lens.

3. The camera lens according to claim 1 further satisfying the following specific condition:

$$2.50 \leq f4/f \leq 6.00$$

where, f is the overall focal distance of the camera lens; f4 is the focal distance of the fourth lens.

4. The camera lens according to claim 1 further satisfying the following specific conditions:

$$-1.50 \leq (R1+R2)/(R1-R2) \leq -0.50$$

wherein, R1 is the object side curvature radius of the first lens; R2 is the image side curvature radius of the first lens.

5. The camera lens according to claim 1 further satisfying the following specific conditions:

$$1.00 \leq (R5+R6)/(R5-R6) \leq 5.00$$

wherein, R5 is the object side curvature radius of the third lens; R6 is the image side curvature radius of the third lens.

* * * * *